US008270458B2

(12) United States Patent  
Valadon

(10) Patent No.: US 8,270,458 B2
(45) Date of Patent: Sep. 18, 2012

(54) TUNABLE FILTER FOR TONE DETECTION

(75) Inventor: Cyril Valadon, Letchworth (GB)

(73) Assignees: MStar Semiconductor, Inc. (KY); MStar Software R&D, Ltd., Shenzhen (CN); MStar France SAS, Issy les Moulineaux (FR); MStar Semiconductor, Inc. (TW)

( * ) Notice: Subject to any disclaimer, the term of this patent is extended or adjusted under 35 U.S.C. 154(b) by 1324 days.

(21) Appl. No.: 11/782,242

(22) Filed: Jul. 24, 2007

(65) Prior Publication Data

US 2007/0265791 A1 Nov. 15, 2007

(30) Foreign Application Priority Data

Mar. 4, 2005 (GB) .............................. GB0504552.1
Feb. 27, 2006 (WO) ................ PCT/GB2006/000686

(51) Int. Cl.
*H04B 3/46* (2006.01)
*H04B 17/00* (2006.01)
*H04Q 1/20* (2006.01)

(52) U.S. Cl. ...................................................... 375/224
(58) Field of Classification Search .................. 375/224
See application file for complete search history.

(56) References Cited

U.S. PATENT DOCUMENTS

| 5,241,688 A | 8/1993 | Arora |
| 5,353,346 A | 10/1994 | Cox et al. |
| 5,457,818 A | 10/1995 | Butler |
| 5,477,465 A | 12/1995 | Zheng |
| 5,930,308 A | 7/1999 | Schmutz |
| 5,970,102 A | 10/1999 | Hwang |
| 6,633,345 B2 * | 10/2003 | Izuta et al. ................... 348/729 |
| 6,674,855 B1 * | 1/2004 | Karelic et al. ............... 379/386 |
| 6,771,767 B1 | 8/2004 | Li et al. |
| 2007/0005308 A1 * | 1/2007 | Lee et al. ......................... 703/2 |

FOREIGN PATENT DOCUMENTS

EP 0795986 A3 11/2000

OTHER PUBLICATIONS

European Search Report 06709911.9, Jan. 11, 2010, pp. 1-7.
PCT International Preliminary Report on Patentability and Written Opinion Corrected Version, PCT/GB2006/000686, pp. 1-6.
WO2006092571 Corrected Search Report/PCT/GB2006/000686, pp. 1-5.

* cited by examiner

*Primary Examiner* — David C. Payne
*Assistant Examiner* — Tanmay Shah
(74) *Attorney, Agent, or Firm* — Edell, Shapiro & Finnan, LLC

(57) ABSTRACT

Apparatus arranged to analyse a signal comprising a series of symbols, the apparatus comprising means for calculating a metric of said signal, filter means for filtering said signal, means for calculating a metric of said filtered signal and means for comparing said metrics, wherein the filtering means is arranged to track a spectral feature of the signal and maintain that feature within the pass band of the filtering means.

14 Claims, 3 Drawing Sheets

TUNABLE FILTER FOR TONE DETECTION

FIELD OF THE INVENTION

The invention relates to communications systems and to the detection of signals, such as synchronisation signals, in such systems.

BACKGROUND OF THE INVENTION

In digital communication systems in particular, it is important for each Mobile Station (MS) to be locked, both in the time domain and in the frequency domain, to the Base Station (BS) that it is in communication with. The acquisition by the MS of the timing and frequency references can be made easier by the BS regularly transmitting a known signal. For example in the Global System for Mobile communications (GSM) system, the BS transmits a Frequency Burst (FB) which format is fixed and known to the MS. This frequency burst consists of a tone at a frequency offset of 1 625/24 kHz above the nominal carrier. The duration of the FB is equal to 148 modulation symbols. The FB is used by the MS in order to acquire coarse timing and frequency locks to the BS. Coarse frequency synchronisation with the BS is achieved by detecting the FB tone and calculating the offset from the expected 1 625/24 kHz reference. Time synchronisation is achieved by detecting the start and end points of the FB. Once coarse time and frequency synchronisation to the BS has been achieved, it is possible for the MS to receive further logical channels in order to establish or receive a connection with the BS. Typically, the Synchronisation Channel (SCH) can be used to achieve a more accurate time and frequency synchronisation with the BS.

The FB transmitted by the BS consists of a pure tone at a frequency offset of 1 625/24 kHz above the nominal carrier. Hence, if the clock references of the BS and MS were perfectly locked, the MS could detect the presence of the FB by looking for a tone at the defined offset of 1 625/24 kHz. However, the clock reference of the MS will never be perfectly aligned with that of the BS. Moreover, this reference may drift with time and temperature. Hence, it is important that the FB detection receiver is able to successfully identify the FB even when the offset is not precisely equal to the expected value of 1 625/24 kHz.

FIG. 1 shows the different components that can be found in a typical receiver. Note that these different stages represent the processing performed on the received signal but do not necessarily correspond to an implementation of an actual receiver. The signal received at the antenna 109 of the receiver is first processed by a Radio-Frequency (RF) unit 101. The resulting analogue electrical signal is then passed to a mixed-signal processing unit 102 for conversion to a digital format. The mixed signal processing includes Analogue-to-Digital Conversion (ADC) 103, low pass filtering 104 and finally decimation 105. This signal is then passed to the digital signal processing unit 106. An FB detection receiver architecture is implemented in a digital signal processing unit 105. Complex I/Q samples are acquired at baseband and are processed in order to identify the frequency tone characterising the FB.

By the nature of the task to be performed, the FB detection receiver belongs to the more generic class of the frequency detection algorithms. As such, a number of different approaches have been proposed in the past for the design of frequency detection receivers.

One possible set of algorithms operates in the frequency domain through the use of the Fast Frequency Transform (FFT) or the Discrete Frequency Transform (DFT). Typically, the received sampled signal is first transformed into the frequency domain. The frequency domain components are then used to identify the presence of a strong frequency component in the received signal. The presence of a strong frequency component will indicate that the FB is being received.

One of the major drawbacks associated with algorithms operating in the frequency domain is the implementation complexity. The transformation of the received, time-domain, signal into the frequency domain can be complex to implement, especially when operating in a real-time environment. Hence, a number of reduced complexity algorithms have been derived. One such algorithm is the Goertzel algorithm (see for example P. Mock, *Add DTMF generation and decoding to DSP microprocessor designs*, EDN, vol. 30, pp. 205-220, Mar. 21, 1985).

However, reduced complexity algorithms such as the Goertzel algorithm also suffer from some limitations. When receivers are using the Goertzel algorithm to detect the frequency burst, the detection accuracy is directly linked to the detection range. A good detection performance is only possible if the detection range is limited. As a result of this, a good detection performance can only be achieved if the frequency reference of the MS meets tight accuracy and stability requirements.

FIG. 2 presents a modified version of the Goertzel algorithm that can be used for the detection of a frequency tone signal.

The received complex signal is first stored in the received signal buffer 201. This received signal buffer can be dimensioned so that it is possible to hold all the samples comprising the frequency burst. Doing so can be useful for the estimation of the offset between the known frequency at which the frequency burst has been transmitted and the frequency of the received frequency burst. The estimation of this frequency offset can then be further used to achieve frequency synchronisation between the BS and the MS.

The complex I/Q samples are then processed in groups of K samples. For each block of K samples, a signal quality value is calculated in unit 203. This value can, for example, be calculated as the energy across the block of received I/Q samples:

$$E_i(k) = \sum_{j=i \times K}^{(i+1) \times K - 1} ((\gamma_I(j))^2 + (\gamma_Q(j))^2)$$

$E_i(k)$ is the input signal quality value for the kth received block. $\gamma_I(j)$ and $\gamma_Q(j)$ are used to denote respectively the I part and Q part of the jth received sample. It will be obvious, to someone skilled in the art, that other measures can be used for the input signal quality. Such measures include signal amplitude and signal to noise ratio.

The input energy values are then further averaged in unit 205. The time constant of this filtering stage should be such that it corresponds to the length of the frequency burst. Assuming that the total number of samples in the frequency burst is equal to N, one possible implementation for the averaging unit 205 is as follows:

$$A_i(m) = \sum_{k=m}^{k=m+\left[\frac{N}{K}\right]-1} E_i(k)$$

The complex samples retrieved from the received signal buffer 201 are also used by the filtering unit 202. Typically, the filter implemented in this processing stage will be a band-pass filter. The pass band of this filter is usually centered on the expected position in the frequency domain of the tone to be detected. In the MGA algorithm, this filtering stage is usually implemented as a second order Infinite Impulse Response (IIR) filter. It should however be noted that this is not an inherent requirement of this approach and that this technique can easily be extended to operate with other filtering techniques.

The filtered complex samples are then processed in unit 204 where the signal quality value is calculated. The computations performed in unit 204 are identical to the calculations performed in unit 202 and are used to generate a filtered energy value $E_f(k)$. These filtered energy values $E_f(k)$ are then used in unit 206 to generate average filtered energy values $A_f(m)$. The processing performed in this stage is identical to that performed in unit 205.

The average input energy values $A_i(m)$ and the filtered energy values $A_f(m)$ are then combined in unit 207 where the ratio of the these two quantities is calculated. The resulting output-to-input energy ratio $\kappa=A_f(m)/A_i(m)$ is then be used to detect the presence of a frequency burst. The detection ratio $\kappa$ can also be used to identify the position, in time, of the start and end points of the detected frequency burst. This information can then be used by the MS to achieve coarse time synchronisation with the BS.

FIG. 3 depicts the trajectory of the energy ratio $\kappa$ and illustrates how this ratio can be used to identify the presence and location of the frequency burst. When the block of received I/Q samples contains any signal except the frequency burst, most of the signal energy will be filtered out by unit 202. This means that the ratio of filtered to input signal energy will be very low. Hence, the value of the detection ratio $\kappa$ will be close to zero. It is noteworthy that the residual level of the detection $\kappa$ in the absence of a frequency burst can be used to estimate the level of noise in the received signal. Since the pass band of the filter implemented in unit 202 is centred around the expected frequency of the frequency burst, the filtered to input energy ratio for a block of samples forming part of the frequency burst will be close to one. As a result of this, when the first block of samples from the frequency burst is processed, the detection ratio $\kappa$ will start rising above the residual noise level. The detection ratio $\kappa$ will rise until the last block of samples from the frequency burst is processed. At this point, the value of the detection ratio should be close to one. Hence, the presence of a tone in the received signal can be identified if the detection ratio $\kappa$ is larger than a threshold value T which value can be determined through simulations, for example. After the maximum value has been reached, the value of the detection ratio will decrease until the residual noise level is reached. Hence, it can be seen that the presence of the frequency burst can be detected by monitoring the rise of the detection ratio $\kappa$. Moreover, the position of the maximum value of the detection ratio can be used to estimate the end position of the frequency burst. This information can then be used to recover BS timing information. When a frequency burst has been identified, it is possible to terminate the MGA processing of the received signal once the maximum value for the detection ratio has been identified. A number of different techniques can be used to identify this maximum value. In one possible implementation, the maximum value can be identified as the last value, above the threshold T, which is larger than its predecessor. Such simple techniques can be refined by looking for a minimum drop in the detection ratio before the MGA processing of the received signal is brought to an end.

As indicated in FIG. 2, the output signal may be written back into the original signal buffer 201. This filtered signal can then be used to calculate the frequency offset between the BS and MS. This frequency offset information will help achieve frequency synchronisation between the MS and the BS. By writing the filtered signal back to the received signal buffer 201, it is possible to reduce the memory requirements of the digital receiver. However, depending on the technique selected for the implementation of the filtering unit 202, this may not be possible. In this case a separate memory store can be used to hold the I/Q samples following the filtering operation.

The MGA is a relatively low complexity algorithm that allows the detection of a frequency burst using a pass band filter with a frequency response centred around the expected location of the tone to be detected. The width of the pass band of the filter drives the detection range of the algorithm. If the filter is very narrow, the receiver will only be able to detect the frequency burst when the location in the frequency domain is close to the expected value. This means that the frequency burst can only detected if the frequency references of the BS and the MS are close to one another. The practical consequence of this requirement is that the frequency reference of the MS needs to be very accurate and stable. The use of such parts will drive up the price of the MS. In order to increase the frequency detection range, it is possible to widen the pass band section of the filter. However, by so doing, the detection probability is reduced and the false alarm probability (defined as the probability of detecting a frequency burst when none has been received) increases.

According to one aspect, the invention provides apparatus arranged to analyse a signal comprising a series of symbols using an adaptation of the Modified Goertzel Algorithm, wherein the adaptation of the MGA utilises filtering means that is arranged to track a spectral feature of the signal and maintain that feature within the pass band of the filtering means.

The invention also consists in a method of analysing a signal comprising a series of symbols using an adaptation of the Modified Goertzel Algorithm, wherein the adaptation of the MGA utilises filtering that is arranged to track a spectral feature of the signal and maintain that feature within the pass band of the filtering.

According to another aspect, the invention provides apparatus arranged to analyse a signal comprising a series of symbols, the apparatus comprising means for calculating a metric of said signal, filter means for filtering said signal, means for calculating a metric of said filtered signal and means for comparing said metrics, wherein the filtering means is arranged to track a spectral feature of the signal and maintain that feature within the pass band of the filtering means.

The invention also consists in a method of analysing a signal comprising a series of symbols, the method comprising calculating a metric of said signal, filtering said signal, calculating a metric of said filtered signal and comparing said metrics, wherein the filtering is arranged to track a spectral feature of the signal and maintain that feature within the pass band of the filtering.

The proposed receiver architecture may be realised in hardware, software on a processor, or a combination thereof.

BRIEF DESCRIPTION OF THE DRAWINGS

By way of example only, certain embodiments of the invention will now be described by reference to the accompanying drawings, in which.

DETAILED DESCRIPTION OF THE EMBODIMENTS

The receiver architectures that will now be described are developments of the Goertzel algorithm described with reference to FIG. 2 that avoid the dependency of the detection accuracy on the detection range. The receiver architectures described below can therefore achieve a good detection performance without imposing tight accuracy and stability requirements on the frequency reference of the host device.

In the architectures described below, a frequency detection receiver processes the received signal in blocks of K complex samples. For each block, a signal quality measure is calculated. The main frequency component of the signal in each block is estimated and is used to derive the coefficients of a filter. The received complex samples are then processed through this filter and the signal quality measure associated with the filtered signal is calculated. The ratio of the filtered signal quality to the input signal quality is used to identify the presence of a signal with a strong frequency component. Because the coefficients of the filter used to process the received signal are calculated for each block of K samples, the detection range of the receiver architectures described below does not depend on the width of the filter. This advantageously results in the detection performance being independent of the detection range. The modification of the filter coefficients for each received block can, however, lead to instabilities in the filtering process. This can be avoided by modifying the state of the filter at the start of each new block of received samples.

With the receiver architectures described below, it is possible for a device hosting such an architecture to achieve coarse time synchronisation with a transmitter by estimating the location in time of the end of the frequency burst. The accuracy of this timing estimate depends on the block length K.

The receiver architectures described below are particularly well suited to handset equipment operating in a cellular communications system such as GSM. The large detection range achieved by the proposed receiver architectures makes it possible for a handset to use a frequency reference with a relaxed set of requirements on accuracy and stability.

Figure 1:
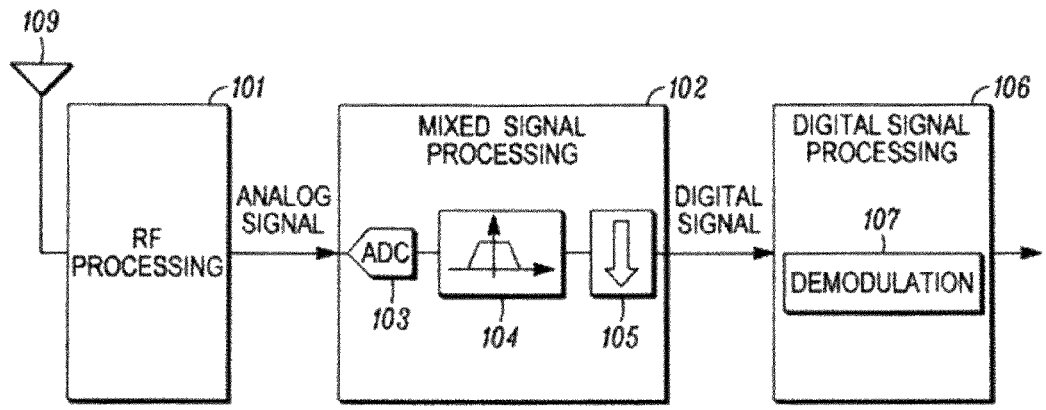
FIG. 1 is a high-level block diagram of a wireless communications signal receiver.
Figure 2:
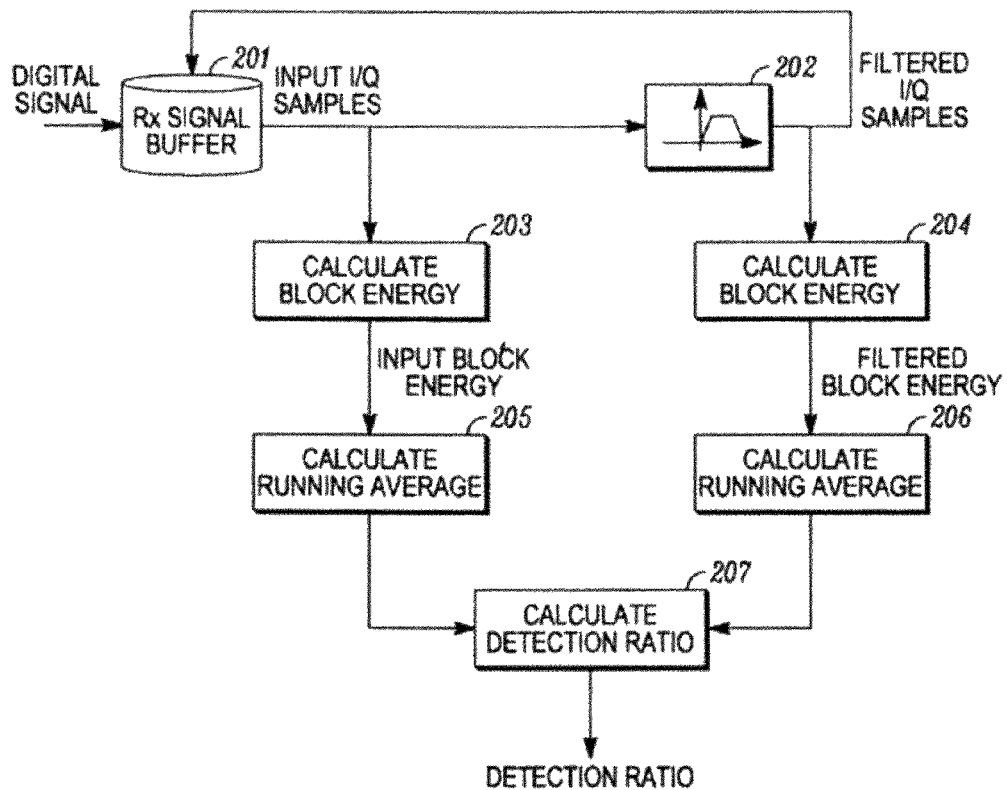
FIG. 2 is a block diagram of a MGA process that can be used in a receiver such as that shown in FIG. 1.
Figure 3:
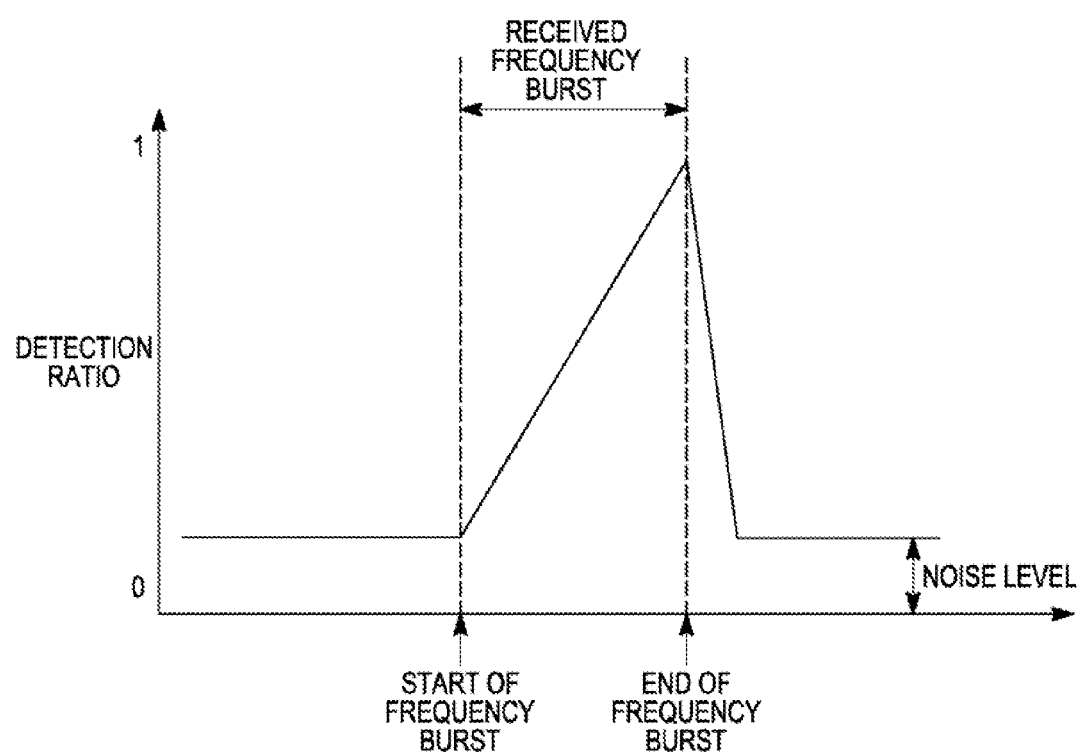
FIG. 3 is a plot of the detection ratio as generated by the MGA process shown in FIG. 2.
Figure 4:
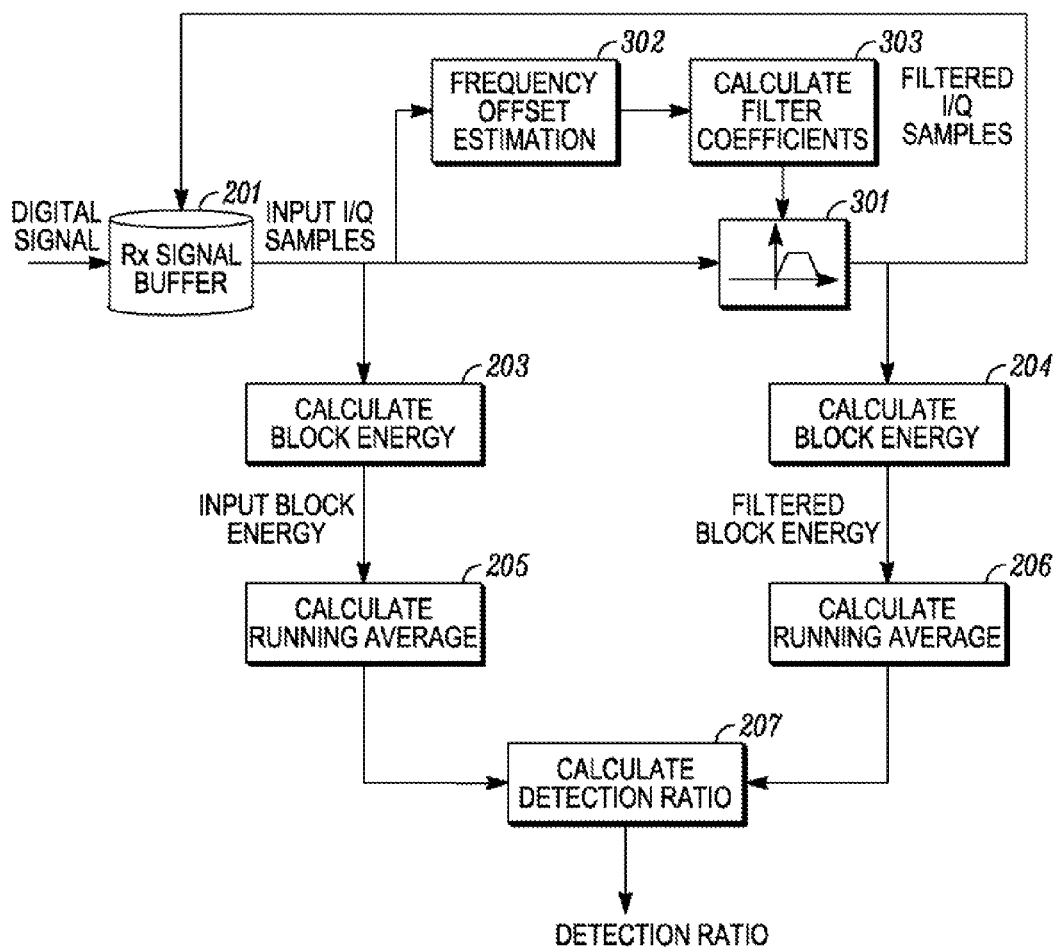
FIG. 4 is a block diagram of a variant of the MGA process shown in FIG. 2.

It can be seen by comparing FIG. 2 and FIG. 4 that the receiver architecture proposed in FIG. 4 is an extension of the MGA architecture shown in FIG. 2 and that most of the processing stages are identical. The main difference between the MGA and the proposed receiver architecture is that the filtering unit 202 is replaced by an adaptive filter 301. In the MGA, the filter used in unit 202 is designed such that the associated frequency response is centred on the expected position of the frequency burst. The receiver architecture shown in FIG. 4 extends this approach by adapting the frequency response of the filter 301 to the frequency content of the received signal. By so doing, the detection range of the receiver is increased and is made independent of the width of the pass band of the filter 301.

For each block of K received samples, the configuration of the filtering unit 301 is modified so as to match the current frequency response. The adaptation of the filter 301 to the received signal characteristics is performed by units 302 and 303. Unit 302 calculates the frequency offset in the block of K received samples. This frequency offset estimate is then used by unit 302 in order to calculate the filter configuration in unit 301. Once configured, unit 301 filters the most recent set of K received samples. This process is repeated for each block of received samples until a frequency burst has been identified or the set of samples to be processed has been exhausted.

A possible implementation of the frequency estimation unit 302 will now be presented. The average phase difference between consecutive symbols within a block can be related to the frequency offset in the given block. This average phase difference can be calculated for the $i^{th}$ received block as follows $$\hat{\theta}(i) = \angle \left( \frac{1}{K-1} \sum_{j=(i \times K)+1}^{(i+1) \times K - 1} \gamma(j) \times \gamma^*(j-1) \right)$$

where $\angle$ denotes "the angular component of" and $\gamma(j)$ is the $j^{th}$ received complex symbol from buffer 201 expressed as $$\begin{cases} \text{Re}(\gamma(j)) = \gamma_I(j) \\ \text{Im}(\gamma(j)) = \gamma_Q(j) \end{cases}$$

The frequency offset is related to the average phase difference through the following equation $$f_e(i) = \frac{\hat{\theta}(i) \times f_s}{2 \times \pi}$$

where $f_s$ is the frequency at which the digital signal has been sampled.

Note that it is possible to use a number of alternative techniques in order to estimate the frequency offset, or the corresponding average phase difference. It would for example be possible to calculate the angular component of each received sample within one block. The frequency offset could then be estimated by performing a linear regression on the phase values since it is proportional to the slope of the linear fit.

Once the average phase difference, or the corresponding frequency offset, has been estimated, the coefficients of the filter 301 are calculated in unit 302. In one preferred embodiment of the proposed receiver architecture, the filter 301 is implemented as a second order IIR. The calculation of the filter configuration will now be described for this preferred embodiment. It will however be easy for someone skilled in the art to extend the proposed approach to other filter configurations.

The frequency response of the proposed second order IIR filter can, in the general case, be expressed in the z-domain as $$H(z) = K \frac{(z - z_0) \times (z - z_1)}{(z - p_0) \times (z - p_1)}$$

$$= K \frac{\left(1 - \frac{z_0}{z}\right) \times \left(1 - \frac{z_1}{z}\right)}{\left(1 - \frac{p_0}{z}\right) \times \left(1 - \frac{p_1}{z}\right)}$$

$\{z_0, z_1\}$ denote the locations of the two zeros and $\{p_0, p_1\}$ denote the locations of the two poles of the filter. In order to reduce the implementation complexity of the filtering unit 301, it is possible to select the two zeros to be located at the origin of the z-plane. When doing so, the frequency response of the filtering unit 301 simplifies to $$H(z) = \frac{K}{(1 - z^{-1} p_0) \times (1 - z^{-1} p_1)}$$

Note however that the proposed approach is not restricted in application to this case.

The location of the two poles controls the frequency response of the filter 301. The filter configuration should be designed such that the pass band of the filter includes the frequency offset estimated by unit 302. By way of example, it is possible to select the pole positions for the $i^{th}$ received block as follows $$\begin{cases} p_0(i) = \alpha \times e^{j \times (\hat{\theta}(i) + \xi)} \\ p_1(i) = \alpha \times e^{j \times (\hat{\theta}(i) - \xi)} \end{cases}$$

The values of the parameters $\alpha$ and $\xi$ control the frequency response of the filter 301 and can be selected to maximise the detection probability.

With this definition of the pole locations, the frequency response of the filter 301, configured for the $i^{th}$ received block, can be expressed as $$H_i(z) = \frac{K}{1 - 2\alpha e^{j\hat{\theta}(i)} \cos(\xi) z^{-1} + \alpha^2 e^{2j\hat{\theta}(i)} z^{-2}}$$

The gain of the filter K should be selected such that $H(z|z=e^{j(\hat{\theta}i)})=1$. This means that the main frequency component of the received block of samples is not attenuated through the filter 301. In order to meet this condition, the filter gain K should be set to $$K = 1 - 2\alpha \cos(\xi) + \alpha^2$$

The overall frequency response of the filter configured for the $i^{th}$ received block can then be expressed as $$H_i(z) = \frac{1 - 2\alpha \cos(\xi) + \alpha^2}{1 - 2\alpha e^{j\hat{\theta}(i)} \cos(\xi) z^{-1} + \alpha^2 e^{2j\hat{\theta}(i)} z^{-2}}$$

It can be seen from the definition of the pole locations that, in the preferred embodiment of the proposed receiver architecture, only the phase is adapted to the received signal spectral characteristics. The amplitude $\alpha$ of the poles is kept constant during the processing of the received signal. This has two major advantages. The first one is that the gain of the filter K does not depend on the phase $\hat{\theta}(i)$ associated with the current block of samples. Similarly, the group delay of the filter does not depend on the estimated phase offset $\hat{\theta}(i)$. These two characteristics of the preferred embodiment of the receiver architecture simplify the implementation of the proposed approach. However, it would be easy for someone skilled in the art to extend the proposed approach to filter configurations where the amplitude $\alpha$ of the poles is adapted to the received signal.

Using the above definition for the frequency response of the filter 305, the filtered signal corresponding to the $j^{th}$ received sample (which belongs to the $i^{th}$ received block) can be expressed as $$\gamma_f(j) = (K \times \gamma(j)) - (a_1(i) \times \gamma_f(j-1)) - (a_2(i) \times \gamma_f(j-2))$$

where $a_1(i)$ and $a_2(i)$ are the complex filter coefficients for the $i^{th}$ received block and are equal to $$\begin{cases} a_1(i) = -2\alpha e^{j\hat{\theta}(i)} \cos(\xi) \\ a_2(i) = \alpha^2 e^{2j\hat{\theta}(i)} \end{cases}$$

These two filter coefficients are the values which are produced by the filter coefficient calculation unit 303.

It can be seen from the equation describing how the filtered signal is generated that the $j^{th}$ filtered sample depends on the $j^{th}$ received sample as well as on the two previously filtered samples $\gamma_f(j-1)$ and $\gamma_f(j-2)$, also referred to as the "filter state". This means that the first filtered sample in received block i+1 depends on the last two filtered samples from block i. However, the filter coefficients for the received block i+1 will, in general, be different to the ones used for the received block i. The use of the filtered value $\gamma_f(j-1)$ and $\gamma_f(j-2)$ from the received block i with the filter coefficients $a_1(i+1)$ and $a_2(i+1)$ associated with the received block i+1 will create a discontinuity in the filtered sequence and can result in instability of the filtered output. Ultimately, this discontinuity will degrade the detection performance of the proposed receiver. One possible solution to this problem would be to re-initialise the filter state whenever starting to process a new block. However, this would introduce a delay, equal to the group delay of the filter, in the generation of the filtered sequence. This is acceptable if the block length K is large compared to the group delay of the filter. However, in practical implementations of the proposed receiver architecture, the block length and the filter group delay will be of the same order of magnitude. Re-initialising the filter state at the start of each new received block would therefore result in a significant loss of filtered signal information. The following technique can be used to avoid this loss.

Before the first sample $\gamma_f(j)$ from received block i+1 is generated, the state of the filter is modified in the following way $$\begin{cases} \hat{\gamma}_f(j-1) = \gamma_f(j-1) \times \left(\frac{a_1(i)}{a_1(i+1)}\right) \\ \hat{\gamma}_f(j-2) = \gamma_f(j-2) \times \left(\frac{a_2(i)}{a_2(i+1)}\right) \end{cases}$$

The state of the filter is modified through multiplication of the ratio of the filter coefficients from block i and the filter coefficients of block i+1. By so doing, the discontinuity in the filtering output is avoided and there is no loss of information due to a re-initialisation of the filter state.

As described earlier in this document, the phase $\hat{\theta}(i)$ used to derive the filter coefficients can be calculated using the average complex symbol difference $$\Delta(i) = \frac{1}{K-1} \sum_{j=(i\times K)+1}^{(i+1)\times K-1} \gamma(j) \times \gamma^*(j-1)$$

This average complex symbol difference is of the form $$\Delta(i) = \beta(i) \times e^{j\hat{\theta}(i)}$$

where $\beta(i)$ depends on the received signal and varies from block to block. Hence, $\hat{\theta}(i)$ can be estimated by calculating the phase of the complex symbol $\Delta(i)$. However, such estimation process is usually very complex as it typically requires the computation of an arctan function. A technique where the computation of the filter coefficients $a_1(i)$ and $a_2(i)$ does not require the explicit calculation of the phase $\hat{\theta}(i)$ will now be described. Such a technique helps reduce the implementation complexity of the proposed receiver architecture.

In order to avoid the explicit calculation of the phase $\hat{\theta}(i)$, the following two quantities are calculated and stored in the receiver memory $$\begin{cases} \hat{\alpha}_1 = -2\alpha\cos(\xi) \\ \hat{\alpha}_2 = \alpha^2 \end{cases}$$

In the preferred embodiment of the proposed receiver architecture, the values $\alpha$ and $\xi$ are not modified during the processing of the received signal. Hence, the values of $\hat{\alpha}_1$ and $\hat{\alpha}_2$ can be pre-calculated and do not need to be updated.

Once, the average complex difference symbol $\Delta(i)$ has been calculated, it is normalised such that the associated amplitude is equal to 1. The resulting complex symbol can be expressed as $$\hat{\Delta}(i) = \frac{\Delta(i)}{|\Delta(i)|}$$

which can be decomposed in its real and imaginary components $$\hat{\Delta}(i) = \hat{\Delta}_R(i) + j \times \hat{\Delta}_I(i)$$

The filter coefficient $a_1(i)$ can then be calculated using the simple multiplication $$a_1(i) = \hat{\alpha}_1 \times \hat{\Delta}(i)$$

Similarly, the filter coefficient $a_2(i)$ can be calculated using the following set of equations $$\begin{cases} a_2^R(i) = \hat{\alpha}_2 \times \left( (\hat{\Delta}_R(i))^2 - (\hat{\Delta}_I(i))^2 \right) \\ a_2^I(i) = 2 \times \hat{\alpha}_2 \times \hat{\Delta}_R(i) \times \hat{\Delta}_I(i) \end{cases}$$

where $a_2^R(i)$ and $a_2^I(i)$ denote the real and imaginary part of the filter coefficient $a_2(i)$ Hence with the proposed technique, the filter coefficients $a_1(i)$ and $a_2(i)$ can be calculated without the explicit computation of the phase $\hat{\theta}(i)$. It should also be noted that, even though the amplitude normalisation of the complex symbol $\Delta(i)$ can be implemented using a square-root computation, well known approximations which do not require the use of such a computationally intense function can be used instead.

As described earlier, the state of the filter is updated before the start of the processing of a new block of data. By so doing, issues related to filter instability are avoided. When this technique is used, each filter state value is scaled by the ratio of old filter coefficients to new filter coefficients. Hence, when implemented according to the equation presented earlier, this technique requires the computation of a ratio of two complex numbers. Such an approach may be computationally complex. Hence, an implementation of the filter state update computations which does not require any complex division to be performed will now be described. The description will be provided for the update of the state $\gamma_f(j-1)$ but it will be obvious to anyone skilled in the art how such an approach can be generalised.

The filter state is updated at the start of a new block according to the following equation $$\hat{\gamma}_f(j-1) = \gamma_f(j-1) \times \left( \frac{a_1(i)}{a_1(i+1)} \right)$$

By definition, the filter coefficients $a_1(i)$ and $a_1(i+1)$ are of the form $$\begin{cases} a_1(i) = \hat{\alpha}_1 \times e^{j\hat{\theta}(i)} \\ a_1(i+1) = \hat{\alpha}_1 \times e^{j\hat{\theta}(i+1)} \end{cases}$$

Hence, the state update equation can be expressed as $$\hat{\gamma}_f(j-1) = \gamma_f(j-1) \times e^{j(\hat{\theta}(i) - \hat{\theta}(i+1))}$$

As a result of this, it is evident that the state update can be implemented as a multiplication with the phasor $\phi = e^{j(\hat{\theta}(i)-\hat{\theta}(i+1))}$. This phasor can be computed using the amplitude normalised average symbol differences $\hat{\Delta}(i+1)$ and $\hat{\Delta}(i)$ corresponding to the current and previous block, respectively. The implementation of this phasor computation only requires additions and multiplications. Hence, using this technique for the filter state update, the implementation complexity can be reduced.

As indicated earlier, the detection of the frequency burst is used not only to achieve frequency synchronisation of the MS with the BS but also to achieve coarse time synchronisation. The location in time of the frequency burst can be used to align the time base of the MS with that of the BS. One possible approach to achieve this consists in identifying the point at which the detection ratio is a maximum. In the absence of noise, this point will correspond to the end of the frequency burst. When the length of the frequency burst N is known by the receiver, it is then possible to calculate the start point of the frequency burst. This timing information then allows the MS to align its time base with that of the BS.

The accuracy of the timing information depends directly on the number of samples processed in each block. If the end of the frequency burst is detected for the $i^{th}$ received block, the exact timing for the end of the frequency burst can correspond to any of the K samples which form part of this block. Hence, in order to detect the timing of the frequency burst with a good accuracy, the block length K should be made as low as possible (in fact it should be equal to 1 in order to provide the best timing accuracy). However, reducing the block length K results in an increase of computational complexity. For each processed block, the phase error $\hat{\theta}(i)$ needs to be estimated and the coefficients of the filter 303 need to be calculated. Reducing the block length K increases the number of such computations. Hence, in the proposed receiver architecture a post-processing stage can be added in order to improve the accuracy of the timing information. By so doing, the timing accuracy can be increased without having to reduce the block length K.

When the end point of the frequency burst is determined solely from the index i of the burst for which the detection ratio κ(i) is maximum, the timing can correspond to any of the samples with indices from the set $\{(i \times K), \ldots, ((i+1) \times K)-1\}$. The choice of the sample corresponding to the end of the burst can then be defined, by convention, to be (i×K). In the proposed receiver architecture, this original estimate is improved by calculating a Centre Of Gravity (COG) of the detection ratios κ(i) within the block of K ratios. Once, the maximum detection ratio κ(i) has been identified, the received signal is processed until M new detection ratios are calculated. The (2×M)+1 detection ratios centred on the maximum detection ratio are then combined and their COG is calculated.

$$\eta = \frac{\sum_{l=-M}^{M} \kappa(i+l) \times l}{\sum_{l=-M}^{M} \kappa(i+l)}$$

The original estimate δ for the end of the frequency burst can then be improved using the COG calculations as follows:

$$\delta = \delta + (\eta \times k)$$

Hence, using the results of the COG computations, it is possible to achieve a resolution for the timing estimate which is lower than the block length K.

Finally, it should be noted that the proposed receiver architecture can easily be extended by modifying the calculation of the frequency offset, or equivalently the phase error, such that results from multiple received blocks are combined. In the preferred embodiment of the proposed approach, the phase error $\hat{\theta}(i)$ is estimated using only received samples from the $i^{th}$ received block. It would however be possible to use samples received in previous blocks in order to derive this phase estimate. One possible implementation of such an extension of the proposed receiver architecture would be to filter the phase error estimates $\hat{\theta}(i)$ associated with the different received blocks before being used in the filter coefficient calculation unit 303.

The invention claimed is:

1. An apparatus arranged to analyze a signal comprising a series of symbols arranged into a train of blocks, the apparatus comprising:
    means for calculating a metric of a block of the train;
    band pass filtering means for filtering said block;
    means for calculating a metric of said filtered block;
    means for comparing said metrics; and
    means for controlling the filtering means by adapting the pass band of the filtering means from block to block so that the pass band admits the main frequency component as it appears in each block,
    wherein the filtering means has filter poles $\alpha e^{j(\hat{\theta}+\xi)}$ and $\alpha e^{jx(\hat{\theta}-\xi)}$, where α and ξ dictate the filter shape and $\hat{\theta}$ is an average phase difference between consecutive symbols within said block.

2. The apparatus according to claim 1, wherein the control means adapts the pass band for the filtering of a block before that block is filtered by the filtering means.

3. The apparatus according to claim 1, further comprising:
    means for calculating Δ, the average difference between consecutive symbols within a block; and
    means for calculating $\hat{\theta}$ by determining the angular component of Δ.

4. The apparatus according to claim 1, further comprising:
    means for calculating Δ, the average difference between consecutive symbols within a block; and
    means for calculating filter coefficients from expressions in terms of a normalized version of Δ so that the filter coefficients can be calculated without first calculating $\hat{\theta}$.

5. The apparatus according to claim 1, wherein, upon reconfiguration of the filtering means for filtering a new block of the signal after a current block has been filtered, the filtering means is arranged to scale the filter state of the filtering means by a phasor whose argument is the phase difference between two values of $\hat{\theta}$ as evaluated for the current block and said next block, wherein $\hat{\theta}$ is an average phase difference between consecutive symbols within a block.

6. A method of analyzing a signal comprising a series of symbols arranged into a train of blocks, the method comprising:
    calculating a metric of a block of said train;
    filtering said block with a band pass filter;
    calculating a metric of said filtered block;
    comparing said metrics; and
    adapting the pass band of the filter from block to block so that the pass band admits the main frequency component as it appears in each block,
    wherein the filtering has filter poles a $\alpha e^{j(\hat{\theta}+\xi)}$ and $\alpha e^{jx(\hat{\theta}-\xi)}$, where α and ξ dictate the filter shape and $\hat{\theta}$ is an average phase difference between consecutive symbols within a block.

7. The method according to claim 6, wherein the adapting step for a block is carried out before the filtering step is applied to that block.

8. The method according to claim 6, further comprising:
    calculating Δ, the average difference between consecutive symbols within a block; and
    calculating $\hat{\theta}$ by determining the angular component of Δ.

9. The method according to claim 6, further comprising:
    calculating Δ, the average difference between consecutive symbols within a block; and
    calculating filter coefficients from expressions in terms of a normalized version of Δ so that the filter coefficients can be calculated without first calculating $\hat{\theta}$.

10. The method according to claim 6, wherein the method further comprises:
    reconfiguring of the filter for filtering a new block of the signal after a current block has been filtered, wherein the reconfiguring comprises scaling the filter state of the filtering by a phasor whose argument is the phase difference between two values of $\hat{\theta}$ as evaluated for the current block and said next block, wherein $\hat{\theta}$ is an average phase difference between consecutive symbols within a block.

11. A non-transitory computer readable medium comprising program instructions which is executed by processor to perform steps of method of claim 6.

12. A method of analyzing a signal comprising a series of symbols arranged into a train of blocks, the method comprising:
    calculating a metric of a block of said train;
    filtering said block with a band pass filter;

calculating a metric of said filtered block;
comparing said metrics;
adapting the pass band of the filter from block to block so that the pass band admits the main frequency component as it appears in each block; and
reconfiguring of the filter for filtering a new block of the signal after a current block has been filtered, wherein the reconfiguring comprises scaling the filter state of the filtering by a phasor whose argument is the phase difference between two values of $\hat{\theta}$ as evaluated for the current block and said next block, wherein $\hat{\theta}$ is an average phase difference between consecutive symbols within a block.

13. The method according to claim 12, wherein the adapting step for a block is carried out before the filtering step is applied to that block.

14. A non-transitory computer readable medium comprising program instructions which is executed by processor to perform steps of method of claim 12.

* * * * *